United States Patent
Fujita et al.

(10) Patent No.: US 8,237,896 B2
(45) Date of Patent: Aug. 7, 2012

(54) ACTIVE MATRIX SUBSTRATE, METHOD FOR MANUFACTURE OF ACTIVE MATRIX SUBSTRATE, LIQUID CRYSTAL DISPLAY DEVICE, AND ELECTRONIC APPARATUS

(75) Inventors: Tetsuo Fujita, Matsusaka (JP); Yukinobu Nakata, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 486 days.

(21) Appl. No.: 12/445,326

(22) PCT Filed: Oct. 19, 2007

(86) PCT No.: PCT/JP2007/070415
§ 371 (c)(1),
(2), (4) Date: Apr. 13, 2009

(87) PCT Pub. No.: WO2008/099535
PCT Pub. Date: Aug. 21, 2008

(65) Prior Publication Data
US 2010/0006842 A1    Jan. 14, 2010

(30) Foreign Application Priority Data
Feb. 13, 2007   (JP) .................................. 2007-032749

(51) Int. Cl.
*G02F 1/1335* (2006.01)

(52) U.S. Cl. ...................................................... 349/114
(58) Field of Classification Search .................. None
See application file for complete search history.

(56) References Cited

U.S. PATENT DOCUMENTS

| 7,274,420 | B2* | 9/2007 | You | 349/114 |
| 7,352,421 | B2* | 4/2008 | Nakahori et al. | 349/114 |
| 7,440,042 | B2* | 10/2008 | Nagata et al. | 349/43 |
| 7,545,463 | B2* | 6/2009 | Park | 349/113 |
| 7,723,134 | B2* | 5/2010 | Jo et al. | 438/30 |
| 7,843,533 | B2* | 11/2010 | Noguchi et al. | 349/114 |
| 7,859,618 | B2* | 12/2010 | Kim | 349/114 |
| 8,027,001 | B2* | 9/2011 | Kaneko et al. | 349/114 |
| 2002/0005928 | A1 | 1/2002 | Hanakawa et al. | |
| 2004/0004686 | A1 | 1/2004 | Ogawa et al. | |

(Continued)

FOREIGN PATENT DOCUMENTS
CN        1979276 A      6/2007
(Continued)

OTHER PUBLICATIONS
International Search Report for PCT/JP2007/070415 mailed Nov. 20, 2007.

*Primary Examiner* — Tina Wong
(74) *Attorney, Agent, or Firm* — Nixon & Vanderhye P.C.

(57) ABSTRACT

An active matrix substrate (30) of the present invention includes (i) a plurality of TFT elements (2) provided on an insulating substrate (10), and (ii) pixel electrodes (7) electrically connected to the plurality of TFT elements (2), respectively. The pixel electrodes (7) has (i) a first transparent electrode layer (7a), (ii) a reflective electrode layer (7b) stacked on the first transparent electrode layer (7a), which reflective electrode layer (7b) has a smaller area than that of the first transparent electrode layer (7a), and (iii) a second transparent electrode layer (7c) stacked so as to cover at least the reflective electrode layer (7b). Hence, it is possible to realize a transflective liquid crystal display device which suppresses occurrence of a flicker, thereby having high display quality.

20 Claims, 17 Drawing Sheets

U.S. PATENT DOCUMENTS

| | | |
|---|---|---|
| 2005/0030454 A1* | 2/2005 | Jang et al. .................. 349/114 |
| 2005/0186359 A1 | 8/2005 | Ishizuka et al. |
| 2006/0132685 A1* | 6/2006 | You ............................ 349/114 |
| 2006/0267120 A1 | 11/2006 | Nakahori et al. |
| 2006/0290850 A1* | 12/2006 | Kim et al. .................. 349/114 |
| 2007/0013837 A1 | 1/2007 | Ogawa et al. |
| 2007/0024778 A1* | 2/2007 | Kametani et al. ............ 349/114 |
| 2007/0126958 A1* | 6/2007 | Kim et al. .................. 349/114 |
| 2007/0153174 A1* | 7/2007 | Kim ............................ 349/114 |
| 2008/0138921 A1 | 6/2008 | Nakahori et al. |

FOREIGN PATENT DOCUMENTS

| | | |
|---|---|---|
| JP | 2004-191958 | 7/2004 |
| JP | 2004-317748 | 11/2004 |

* cited by examiner ant electrode layer 1005 causes a decrease in reflectance of the reflective electrode layer 1004.

Formation of a thin transparent electrode layer 1005 is considered in such case. However, if the transparent electrode layer 1005 is made too thin in purpose of preventing the decrease in the reflectance, a problem occurs such that a defect generates in the transparent display electrode.

Moreover, the transflective liquid crystal display device 1101 illustrated in FIG. 23 has the reflective electrode layer 1105 formed on the transparent electrode layer 1104, different from the transflective liquid crystal display device 1001 illustrated in FIG. 22. Thus, reflectance of the reflective electrode layer 1105 is not affected by the thickness of the transparent electrode layer 1104.

However, in the pixel electrode 1103, the transparent electrode layer 1104 and the reflective electrode layer 1105 directly face a counter electrode that is formed on a counter substrate. Thus, a difference generates between (i) a work function between the transparent electrode layer 1104 and the counter electrode and (ii) a work function between the reflective electrode layer 1105 and the counter electrode, which transparent electrode layer 1104 and reflective electrode layer 1105 are made of different material from the counter electrode. This difference in the work function causes problems such as a decrease in display quality due to occurrence of a flicker and ghosting in the liquid crystal.

The invention of the present application is accomplished in view of the above problems, and its purpose is to provide an active matrix substrate which is capable of preventing occurrence of a flicker, whereby allows attainment of a transflective liquid crystal display device having a high display quality.

In order to solve the problems, pixel electrodes in accordance with the present invention, which are provided in an active matrix substrate including: a plurality of switching elements provided on a transmissive insulating substrate; and pixel electrodes electrically connected to the plurality of switching elements, respectively, are pixel electrodes which each include: a first transparent electrode layer; a reflective electrode layer having a smaller area than that of the first transparent electrode layer, at least one part of the reflective electrode layer being stacked on the first transparent electrode layer; and a second transparent electrode layer stacked on the first transparent electrode layer so as to cover at least the reflective electrode layer.

Moreover, in order to solve the problems, a method of the present invention for manufacturing the active matrix substrate including (i) a plurality of switching elements provided on a transmissive insulating substrate and (ii) pixel electrodes electrically connected to the plurality of switching elements, respectively, is a method including the steps of: (a) forming the plurality of switching elements on the transmissive insulating substrate; and (b) forming the pixel electrodes that are electrically connected to the plurality of switching elements, respectively, formed on the insulating substrate, the step (b) including the steps of: forming a first transparent electrode layer; forming a reflective electrode layer on the first transparent electrode layer, the reflective electrode layer having a smaller area than that of the first transparent electrode layer; and forming a second transparent electrode layer so as to cover at least the reflective electrode layer.

According to the arrangement, pixel electrodes are arranged such that a first transparent electrode layer, a reflective electrode layer, and a second transparent electrode layer are stacked. Further, since the reflective electrode layer has a smaller area than that of the first transparent electrode layer, a region that has the reflective electrode layer becomes a

ACTIVE MATRIX SUBSTRATE, METHOD FOR MANUFACTURE OF ACTIVE MATRIX SUBSTRATE, LIQUID CRYSTAL DISPLAY DEVICE, AND ELECTRONIC APPARATUS

This application is the U.S. national phase of International Application No. PCT/JP2007/070415 filed 19 Oct. 2007 which designated the U.S. and claims priority to Japanese Application No. 2007-032749 filed 13 Feb. 2007, the entire contents of each of which are hereby incorporated by reference.

TECHNICAL FIELD

The present invention relates to an arrangement of an active matrix substrate in a liquid crystal display device.

BACKGROUND ART

Proposals have been made of, as one form of a liquid crystal display device, a transflective liquid crystal display device which has a transmissive function and a reflection function. Examples of such a transflective liquid crystal display device are disclosed in Patent Literatures 1 and 2.

A transflective liquid crystal display device 1001 disclosed in Patent Literature 1, as illustrated in FIG. 22, has a pixel electrode 1003, in which a reflective electrode layer 1004 is provided on a transmissive insulating substrate 1002 so as to correspond to a reflective region in a display region of one pixel and a transparent electrode layer 1005 is stacked on the reflective electrode layer 1004 so as to cover (i) the reflective electrode layer 1004 and (ii) an entire display region of the one pixel.

Moreover, a transflective liquid crystal display device 1101 disclosed in Patent Literature 2, as illustrated in FIG. 23, has a pixel electrode 1103, in which a transparent electrode layer 1104 is provided on a transmissive insulating substrate 1102 so as to cover a display region of one pixel, and further a reflective electrode layer 1105 is stacked on the transparent electrode layer 1104 so as to correspond to a reflective region in the display region of the one pixel.

CITATION LIST

Patent Literature 1

Japanese Patent Application Publication, Tokukai, No. 2003-255378 A (Publication Date: Sep. 10, 2003)

Patent Literature 2

Japanese Patent Application Publication, Tokukai, No. 2004-191958 A (Publication Date: Jul. 8, 2004)

SUMMARY OF INVENTION

In the transflective liquid crystal display device 1001, the transparent electrode layer 1005 is provided so as to cover the reflective electrode layer 1004. This transparent electrode layer 1005 is used as a transparent display electrode. Therefore, external light is transmitted through the transparent electrode layer 1005 and reached to the reflective electrode layer 1004, and reflected light is emitted through the transparent electrode layer 1005.

In order to retain strength of a transmissive display electrode, usually, it is required for the transparent electrode layer 1005 to have a thick film thickness. However, a problem reflective region, and a region that does not have the reflective electrode layer becomes a transmissive region.

The second transparent electrode layer is stacked so as to cover at least the reflective electrode layer. Thus, the reflective region is a region in which at least three layers are stacked: the first transparent electrode layer, the reflective electrode layer, and the second transparent electrode layer; and the transmissive region is a region in which (i) two layers are stacked: the first transparent electrode layer and the second transparent electrode layer, and (ii) just the first transparent electrode layer is provided.

This arrangement forms the second transparent electrode layer on at least a surface of the reflective region, in the pixel electrodes. Hence, it is possible to have a same surface material between the reflective region and the transmissive region.

Thus, when the active matrix substrate of the above arrangement is used in a liquid crystal display device, a difference in voltage applied to a liquid crystal layer (flicker voltage difference) is reduced between the transmissive region and the reflective region, in the pixel electrodes of the active matrix substrate. This suppresses the flicker to occur caused by a large difference between the voltages. Hence, it is possible to improve display quality.

It is preferable for the second transparent electrode layer to be formed so as to have end surfaces which are in plane with end surfaces of the first transparent electrode layer, respectively.

In this case, parasitic capacitance that generates due to displacement of the second transparent electrode layer and the first transparent electrode layer is not generated. Hence, it is possible to prevent a decrease in display quality caused by the parasitic capacitance.

An active matrix substrate which includes the above pixel electrode arrangement can be manufactured by the following manufacturing method.

In order to attain the object, a method of the present invention for manufacturing the active matrix substrate including (i) a plurality of switching elements provided on a transmissive insulating substrate and (ii) pixel electrodes electrically connected to the plurality of switching elements, respectively, is a method including the steps of: (a) forming the plurality of switching elements on the transmissive insulating substrate; and (b) stacking (i) a first transparent electrode layer electrically connected to the plurality of switching elements formed on the insulating substrate, (ii) a reflective electrode layer stacked on the first transparent electrode layer, the reflective electrode layer having a smaller area than that of the first transparent electrode layer, and (iii) a second transparent electrode layer stacked so as to cover at least the reflective electrode layer, so as to form each of the pixel electrodes, the step (b) including the steps of: forming a first transparent conductive film on the insulating substrate; forming and patterning a reflective electrode film on the first transparent conductive film so as to form the reflective electrode layer; forming a second transparent conductive film from which the second transparent electrode layer is formed so as to cover the reflective electrode layer formed on the first transparent conductive film; and patterning the first and second transparent conductive films together so as to form the first and second transparent electrode layers.

As described above, the method includes patterning of the first and second transparent conductive films together, so as to form the first and second transparent electrode layers. This method eliminates a need for carrying out patterning to the first and second transparent electrode layers separately. Thus, manufacturing steps can be reduced.

Not only that, this method also enables to substantially eliminate any alignment errors that generate between the first and second transparent electrode layers.

Moreover, it is preferable to provide the second transparent electrode layer so as to have a first end surface in the second transparent electrode layer opposite to a second end surface on which side the second transparent electrode layer is directly stacked on the first transparent electrode layer, the first end surface being in plane with a corresponding end surface of the reflective electrode layer.

In this case, parasitic capacitance that generates due to displacement of the second transparent electrode layer and the reflective electrode layer is not generated. Hence, it is possible to prevent a decrease in display quality caused by the parasitic capacitance.

Such parasitic capacitance gives great influence in a case where liquid crystal of a vertical alignment mode is used. Therefore, an arrangement in which the parasitic capacitance is not generated as in the above arrangement is suitable particularly for a liquid crystal display device of a vertical alignment mode.

An active matrix substrate which includes the above pixel electrode arrangement can be manufactured by the following manufacturing method.

In order to attain the object, a method of the present invention for manufacturing the active matrix substrate including (i) a plurality of switching elements provided on a transmissive insulating substrate, and (ii) pixel electrodes electrically connected to the plurality of switching elements, respectively, is a method including the steps of: (a) forming the plurality of switching elements on the transmissive insulating substrate; and (b) stacking (i) a first transparent electrode layer electrically connected to the plurality of switching elements formed on the insulating substrate, (ii) a reflective electrode layer stacked on the first transparent electrode layer, the reflective electrode layer having a smaller area than that of the first transparent electrode layer, and (iii) a second transparent electrode layer stacked so as to cover at least the reflective electrode layer, so as to form each of the pixel electrodes, the step (b) including the steps of: forming and patterning a first transparent conductive film on the insulating substrate so as to form the first transparent electrode layer; forming and patterning a reflective electrode film on the first transparent electrode layer so as to form the reflective electrode layer; and forming a second transparent electrode layer by forming and patterning a second transparent conductive film from which the second transparent electrode layer is formed so as to cover the reflective electrode layer formed on the first transparent electrode layer.

As described above, forming and patterning the second transparent conductive film from which the second transparent electrode layer is formed, so as to form the second transparent electrode layer, causes end surfaces of the reflective electrode layer provided under the second transparent electrode layer to also be patterned. As a result, it is possible to substantially eliminate any alignment errors that generate between the second transparent electrode layer and the reflective electrode layer.

The second transparent electrode layer may be an IZO (Indium Zinc Oxide) layer.

Usually, IZO is a material in which electric corrosion does not occur upon direct contact with aluminum used for a reflective electrode in view of reflectance. Therefore, if the second transparent electrode layer is an IZO layer, it is possible to form the second transparent electrode layer directly on the reflective electrode layer, when the reflective electrode layer is made of aluminum.

In this case, since the IZO layer is formed on the reflective electrode layer, it is preferable to form the reflective electrode layer as thin as possible, in view of the reflectance.

For example, in view of the reflectance, it is preferable for the IZO layer to have a thickness set in a range of 50 Å to 300 Å.

The thickness of the IZO layer not thicker than 50 Å causes a fault to occur in the second transparent electrode layer. On the other hand, the thickness of the IZO layer thicker than 300 Å causes a reflectance ratio (ratio of emitted light amount to incident light amount) in the reflective electrode layer to rapidly decrease, thereby causing a decrease in display quality.

Although the IZO layer is to be made thicker than 50 Å, in consideration of the decrease in the reflectance ratio, the IZO layer is necessarily formed so as to have the thickness as close to 50 Å as possible. In this case, even though the fault readily generates in the second transparent electrode layer with a thin IZO layer, as long as the thickness of the first transparent electrode layer formed under the reflective electrode layer is sufficiently thick, the first transparent electrode layer sufficiently functions as the transmissive display. Thus, it is possible to prevent a decrease in yield due to pixel electrode defect caused by the fault in the second transparent electrode layer.

The second transparent electrode layer may be an ITO (Indium Tin Oxide) layer. In this case, it is preferable to use Al alloy metal for the reflective electrode layer, so as to prevent occurrence of electric corrosion.

Moreover, use of the ITO for the second transparent electrode layer attains an effect such that a material for the transparent electrode is unified, which improves production efficiency.

The active matrix substrate of the above arrangement is suitably used in a liquid crystal display device as described below.

That is to say, in order to attain the object, a liquid crystal display device of the present invention includes: an active matrix substrate including (i) a plurality of switching elements provided on a transmissive insulating substrate and (ii) pixel electrodes electrically connected to the plurality of switching elements, respectively; and a counter substrate on which counter electrodes are provided so as to face the active matrix substrate.

A liquid crystal display device of the above arrangement is a transflective liquid crystal display device in which functions of a reflective display and a transmissive display are included in one pixel electrode. Use of the active matrix substrate arranged as above enables reducing the flicker voltage difference between the reflective display and the transmissive display to the least possible. As a result, it is possible to realize a liquid crystal display device in which the flicker is suppressed, thereby attaining high display quality.

Moreover, the liquid crystal display device is suitably used in any electronic apparatus that includes a liquid crystal display device. For instance, the liquid crystal display device of the above arrangement may be included in various electronic apparatuses such as a television receiver, a mobile phone, or the like.

For example, in the case of the television receiver, it is possible to display a video in which the flicker is suppressed, thereby having high display quality.

DESCRIPTION OF EMBODIMENTS

First Embodiment

One embodiment of the present invention is as described below.

Figure 1:
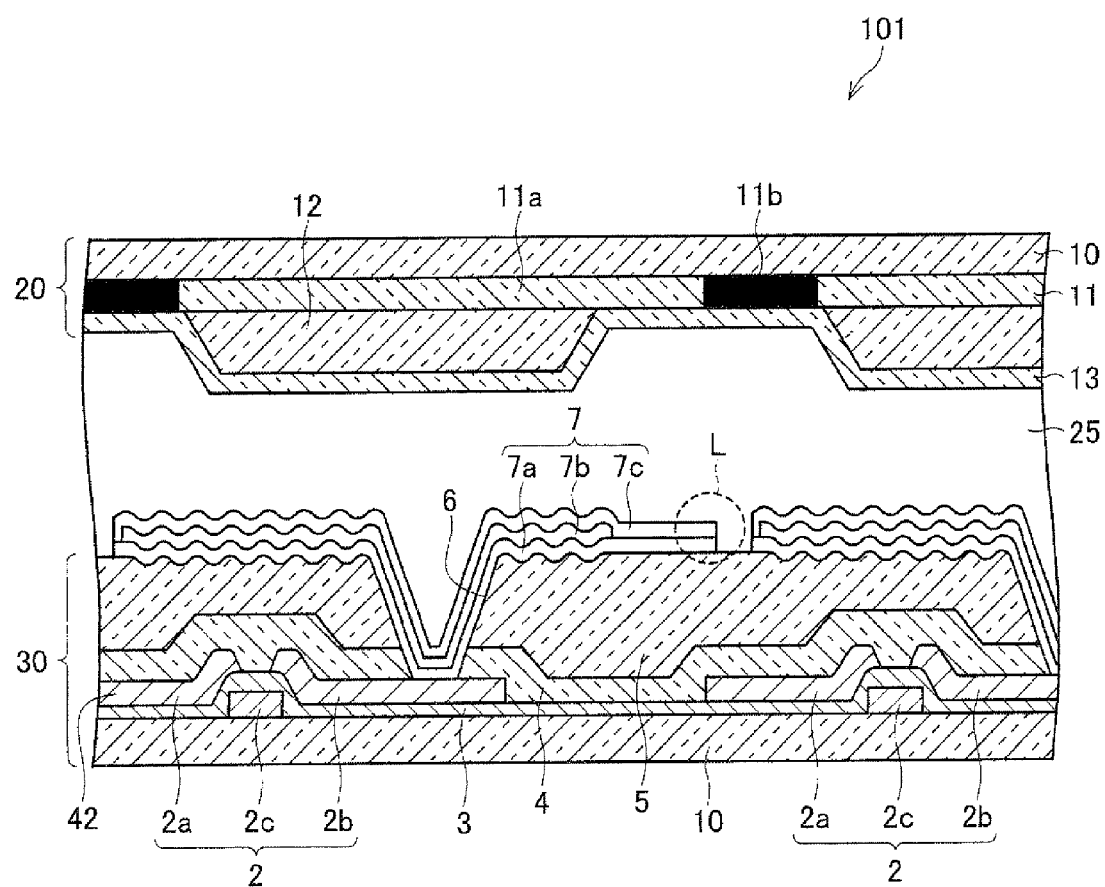
FIG. 1 illustrates an embodiment of the present invention, and is a cross sectional view schematically illustrating a transflective liquid crystal display device.

FIG. 1 is a view illustrating a schematic cross section of a transflective liquid crystal display device in accordance with the present embodiment.

Note that, explanation is made based on a case where a VA (Vertical Alignment) mode is adopted as a display mode of the liquid crystal display device. Moreover, an active matrix drive by use of a TFT (Thin Film Transistor) is adopted as a drive method of the liquid crystal display device. However, the present invention is not limited to this display mode and drive method.

The liquid crystal display device 101 is arranged so as to include, as illustrated in FIG. 1, one pair of substrates (a counter substrate 20 and an active matrix substrate 30) and polarizing plates (not illustrated) that are provided on opposing surfaces of the substrates which face each other.

In the liquid crystal display device 101, a liquid crystal layer 25 is filled between the counter substrate 20 and the active matrix substrate 30. Orientation of the liquid crystal layer 25 is electrically changed so as to arbitrary change states of the liquid crystal layer 25, between (i) a state in which polarized light incident on the polarizing plate from a light source is rotated by approximately 90 degrees, (ii) a state in which the polarized light is not rotated, and (iii) an intermediate state of the two foregoing states.

The counter electrode 20 has, on an insulating substrate 10, a color filter layer 11 and a transparent layer 12. The color filter layer 11 includes (i) a colored layer 11a which serve as color filters for the three principle colors (red, green, blue) and (ii) a black matrix (BM) 11b. The transparent layer 12 is provided so as to correspond to the colored layer 11a. Further, a counter electrode 13 is provided so as to cover the transparent layer 12. Although not illustrated, a vertical alignment film, a projection for controlling alignment and the like are provided on a liquid crystal layer 25 side of the counter electrode 13.

The following explanation describes a method for manufacturing the counter substrate 20.

First, a negative-type acrylic photosensitive resin liquid in which carbon fine particles are dispersed is applied by spin coating on a glass substrate that serves as the transmissive insulating substrate 10. This resin liquid is dried, so as to form a black photosensitive resin layer. Next, the black photosensitive resin layer is exposed to light via a photo mask and developed, so as to form a black matrix 11b. At this time, the black matrix 11b is formed such that an opening of a first color layer (for example, a red layer) is formed in the region in which the first color layer is formed, an opening of a second color layer (for example, a green layer) is formed in the region in which the second color layer is formed, and an opening of a third color layer (for example, a blue layer) is formed in the region in which the third color layer is formed (each opening corresponds to respective pixel electrodes).

Subsequently, a pigment-dispersed negative type acrylic photosensitive resin liquid is applied by spin coating and is dried. Thereafter, the resin liquid thus dried is exposed to light and developed by use of a photo mask. This forms a red color layer as the color layer 11a.

Thereafter, the second color layer (for example the green layer) and the third color layer (for example the blue layer) are formed as similar to the red color layer. This makes up the color filter layer 11.

Further, a negative type acrylic photosensitive resin liquid that does not contain color pigment for example is applied on the color layer 11a and dried, then exposed to light and developed by use of a photo mask, so as to form the transparent layer 12.

Following this, the counter electrode 13 made of a transmissive electrode such as ITO (Indium Tin Oxide) is formed by sputtering.

The counter substrate 20 is thus formed by the above method.

The active matrix substrate 30, as illustrated in FIG. 1, is arranged such that wiring such as TFT elements 2, source signal wiring 42 and the like, a protection insulating film 4 that covers the TFT elements 2 and the source signal wiring 42, an interlayer insulating film 5 that covers the protection insulating film 5, and the pixel electrodes 7 are formed on the insulating substrate 10. Note that, although not illustrated, a vertical alignment film is provided on a liquid crystal layer 25 side of the pixel electrode 7.

The following description explains the active matrix substrate 30 in details.

Figure 2:
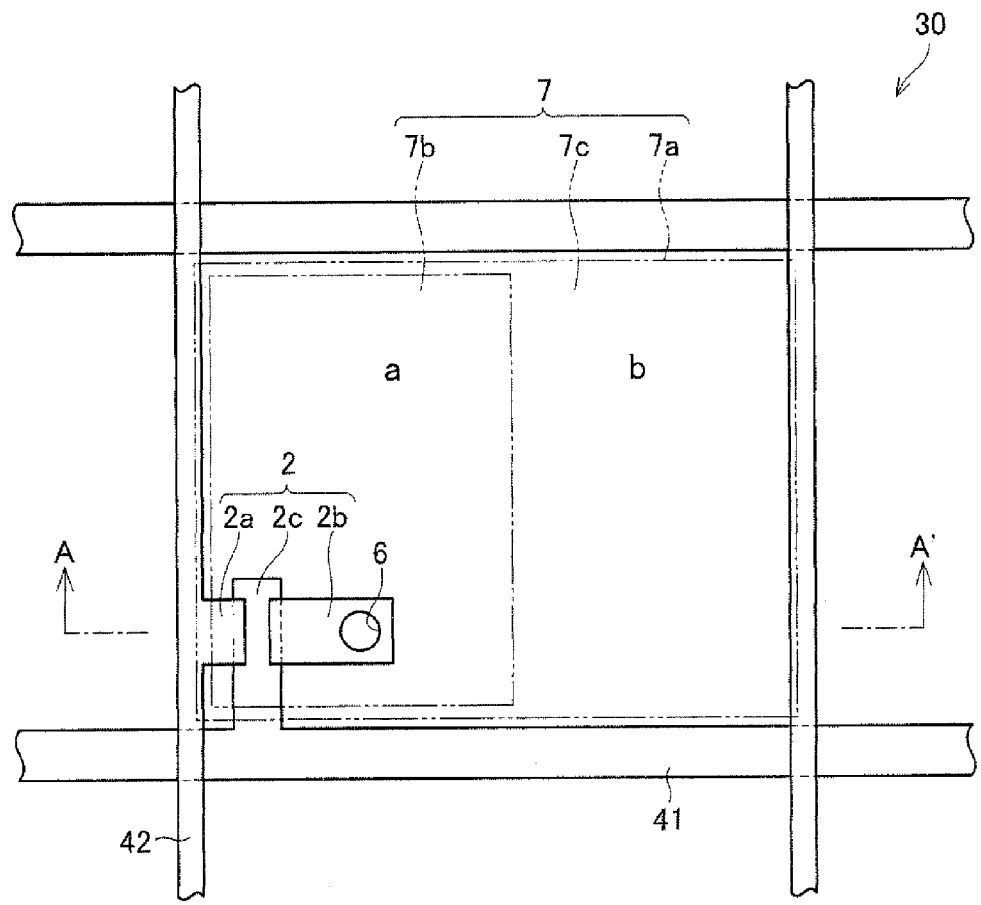
FIG. 2 is a plan view of an active matrix substrate which constructs the transflective liquid crystal display device illustrated in FIG. 1.
Figure 3:
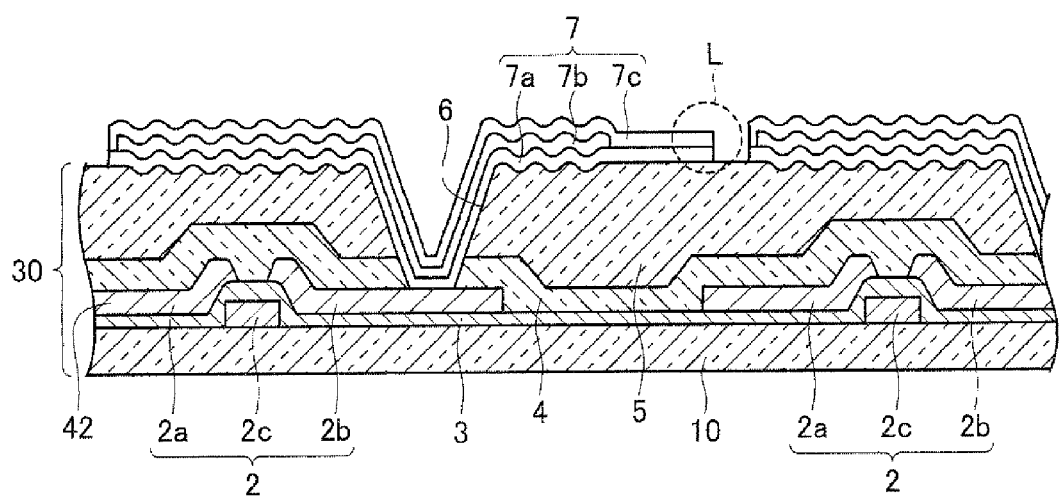
FIG. 3 is a cross sectional view illustrating the active matrix substrate on line A-A' illustrated in FIG. 2.

FIG. 2 is a plan view of the active matrix substrate 30 according to the present embodiment, and FIG. 3 illustrates a cross section on a line A-A' as shown in FIG. 1.

The pixel electrodes 7 are transmissive electrodes. As illustrated in FIG. 2, the pixel electrodes 7 are provided at positions at which the gate signal lines 41 and the source signal lines 42 intersect with each other. Each of the pixel electrodes 7 have a reflective region a in which light is reflected, and a transmissive region b in which light is transmitted.

Each of the pixel electrodes 7, as illustrated in FIG. 3, is electrically connected to a drain electrode 2b which construct the TFT element 2, via a contact hole 6 which passes through the protection insulating film 4 and the interlayer insulating film 5.

The pixel electrodes 7 are of a triple layer arrangement which stacks, from a side closer to the drain electrode 2b, the transparent electrode layer 7a, the reflective electrode layer 7b, and the transparent electrode layer 7c. Namely, the pixel electrodes 7 are of a sandwiched arrangement, in which the reflective electrode layer 7b is sandwiched between the transparent electrode layers 7a and 7b.

Moreover, the two transparent electrode layers 7a and 7b are arranged so as to extend toward adjacent pixel electrodes 7, from an electrically connected section of the pixel electrodes 7 and the TFT elements 2.

However, the reflective electrode layer 7b is extended from the electrically connected section so as not to reach ends of the transparent electrode layers 7a and 7b.

As such, the reflective region a in the pixel electrodes 7 is formed in accordance with the reflective electrode layer 7b, and the transmissive region b is formed by regions of the transparent electrode layers 7c and 7a that construct the pixel electrodes 7, however excluding the region of the reflective electrode layer 7b.

The following description explains a method for manufacturing the active matrix substrate 30.

A step (1) of forming the active matrix substrate 30 until before the pixel electrodes 7 are made is first described, and a step (2) in which the pixel electrodes 7 that are a feature of the invention of the present application is made is described thereafter.

Figure 4:
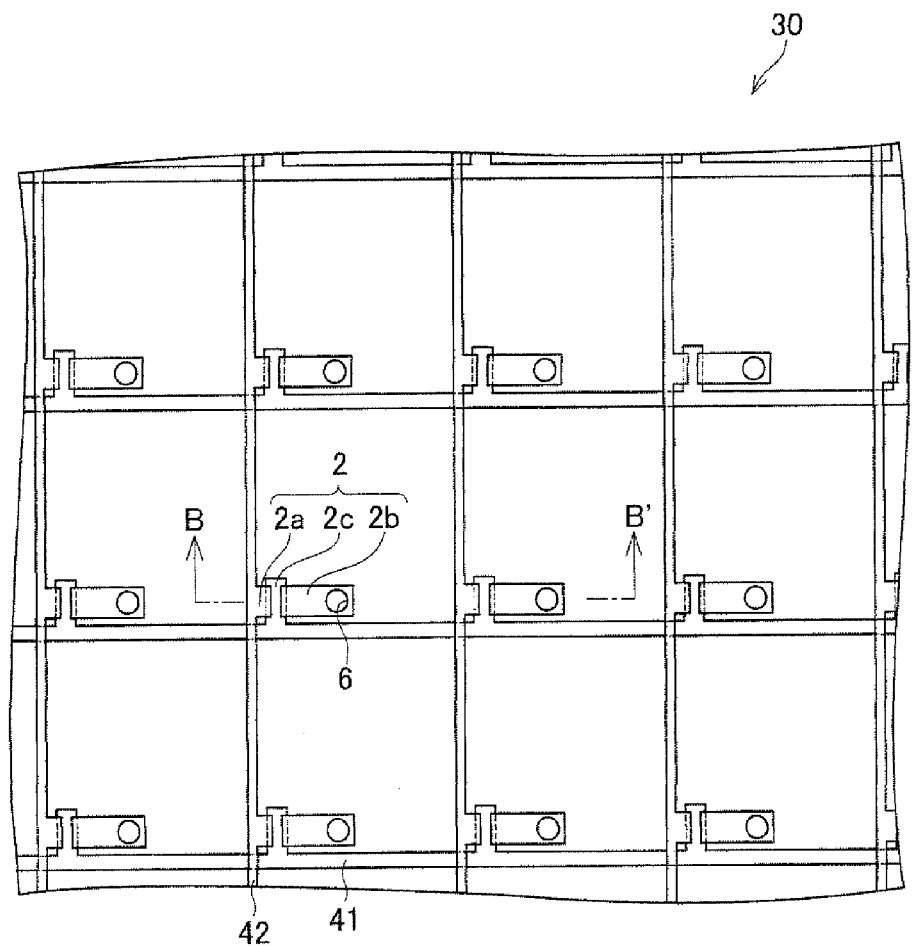
FIG. 4 is a plan view illustrating the active matrix substrate illustrated in FIG. 2 in a state in which pixel electrodes are not formed yet.
Figure 5:
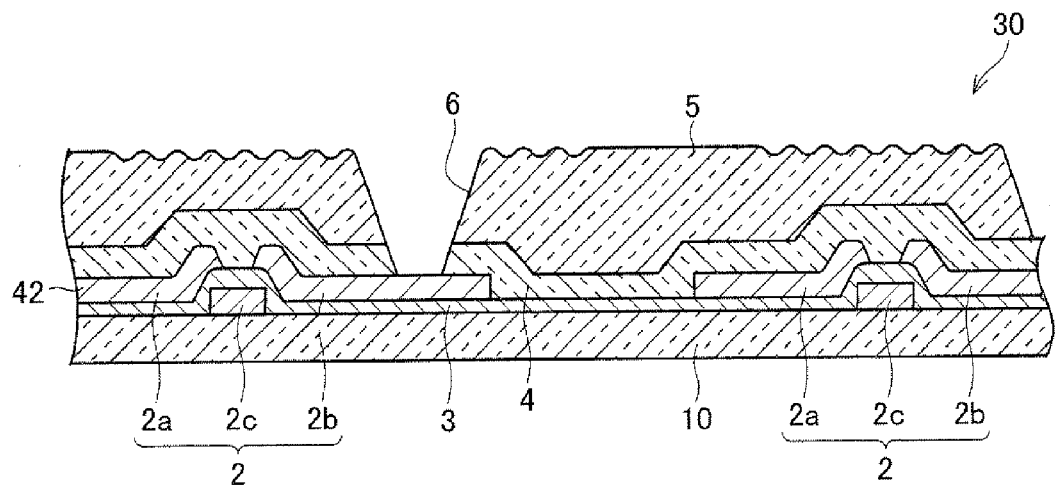
FIG. 5 is a cross sectional view illustrating the active matrix substrate in which the pixel electrodes are not formed yet, on line B-B' illustrated in FIG. 4.

The following description explains the step (1). This description explains procedures carried out before the pixel electrodes 7 are formed, that is, until the interlayer insulating film 5 and the contact hole 6 are formed, as illustrated in FIGS. 4 and 5. FIG. 4 is a plan view of the active matrix substrate 30 in a state in which the pixel electrodes are not formed yet. FIG. 5 is a cross sectional view of the active matrix substrate 30 on a line B-B' as illustrated in FIG. 4.

First, on an entire substrate of the insulating substrate 10 which is a glass substrate or the like, a metal film made of aluminum, titanium or the like is formed by sputtering so as to have a film thickness of around 4000 Å. Subsequently, pattern forming is carried out by a photolithography technique (Photo Engraving Process, hereinafter referred to as "PEP technique"). This forms gate signal lines 41 and gate electrodes 2c.

Following this, on the entire substrate on which the gate signal lines 41 and the gate electrodes 2c are formed, a silicon nitride film or the like is formed so as to have a film thickness of around 4000 Å, by a CVD (Chemical Vapor Deposition) technique. This forms a gate insulating film 3.

Further, an intrinsic amorphous silicon film (having a film thickness around 1700 Å) and an n+amorphous silicon film doped with phosphorus are consecutively formed on the entire substrate on which the gate insulating film 3 is formed, by the CVD method. Thereafter, island-shaped pattern forming is carried out on the gate electrodes 2c by the PEP technique, so as to form a semiconductor layer (not illustrated) made of the intrinsic amorphous silicon film and the n+amorphous silicon film.

Subsequently, a metal film made of aluminum, titanium or the like is formed by sputtering so as to have a film thickness of around 1500 Å. Pattern forming is carried out by the PEP techniques so as to form the source signal lines 42, the source electrode 2a, and the drain electrode 2b.

Following this, the source electrode 2a and the drain electrode 2b serve as a mask to remove the n+amorphous silicon layer by etching. This forms a channel section, and thus a TFT element 2 is formed.

Further, a silicon nitride film or the like is formed by a CVD (Chemical Vapor Deposition) technique on the entire substrate on which the source electrode 2a and the drain electrode 2b are formed, so as to have a film thickness of around 2500 Å. This forms a protection insulating film 4. On the entire substrate on which the protection insulating film 4 is formed, a photosensitive acrylic resin or the like is applied so as to have a thickness of around 3.0 μm. Thereafter, pattern formation is carried out thereto by the PEP technique so as to cover the protection insulating film 4. This forms an interlayer insulating film 5 in which each of the pixels (formation section) P has a contact hole 6, as illustrated in FIG. 4.

Figure 6:
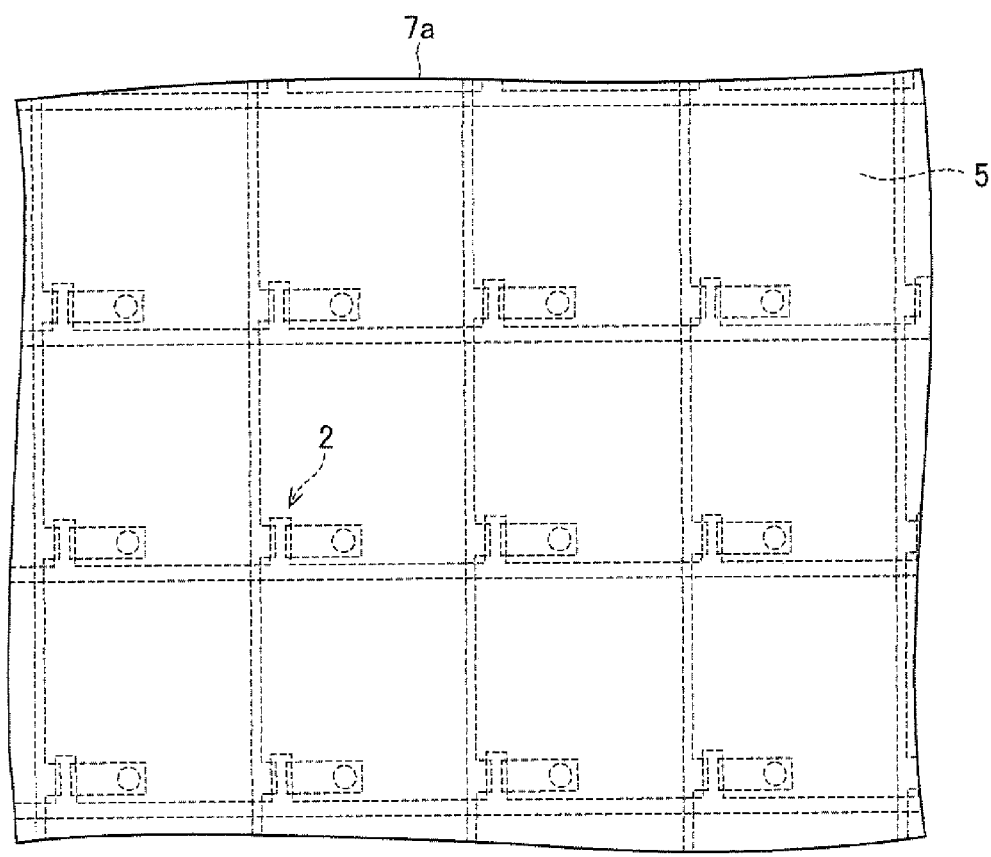
FIG. 6 is a plan view illustrating a state in which a first transparent electrode layer is formed on an interlayer insulating film of the active matrix substrate in which the pixel electrodes are not formed yet as illustrated in FIG. 4.
Figure 7:
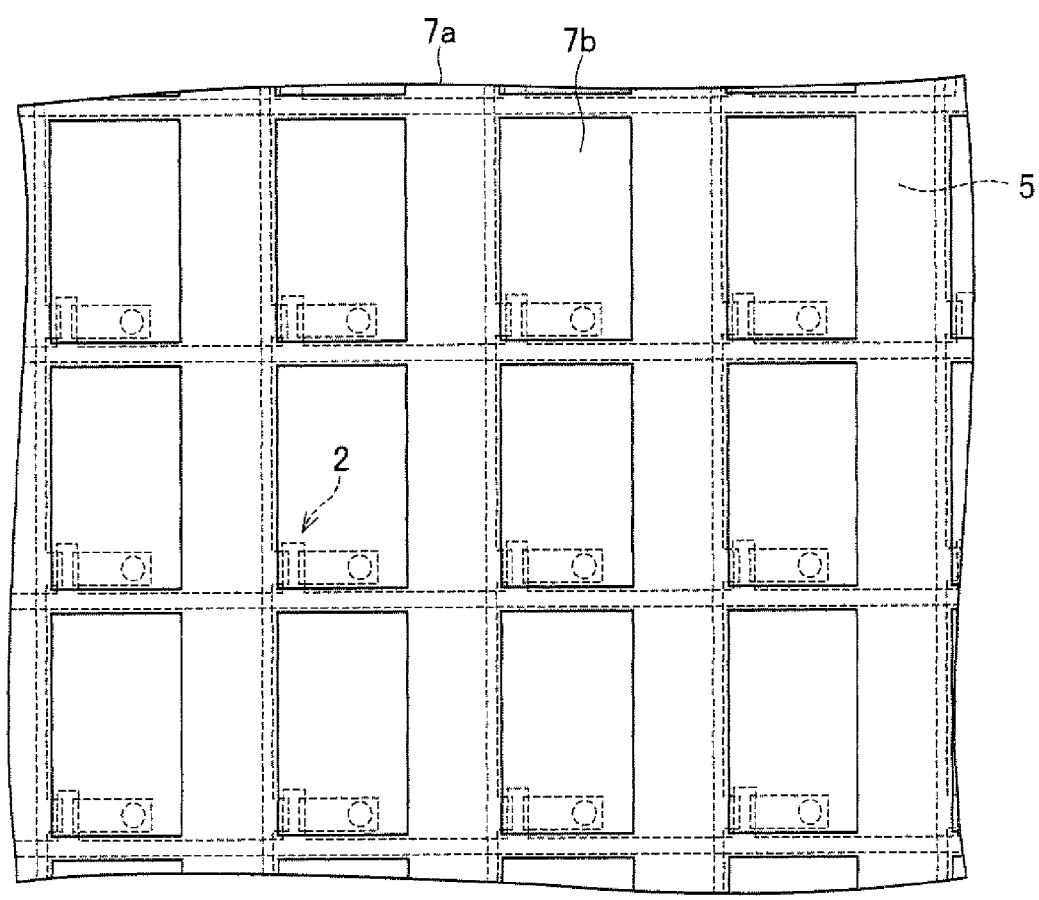
FIG. 7 is a plan view illustrating a state in which a reflective electrode layer is formed on the first transparent electrode layer of the active matrix substrate in the state illustrated in FIG. 6.
Figure 8:
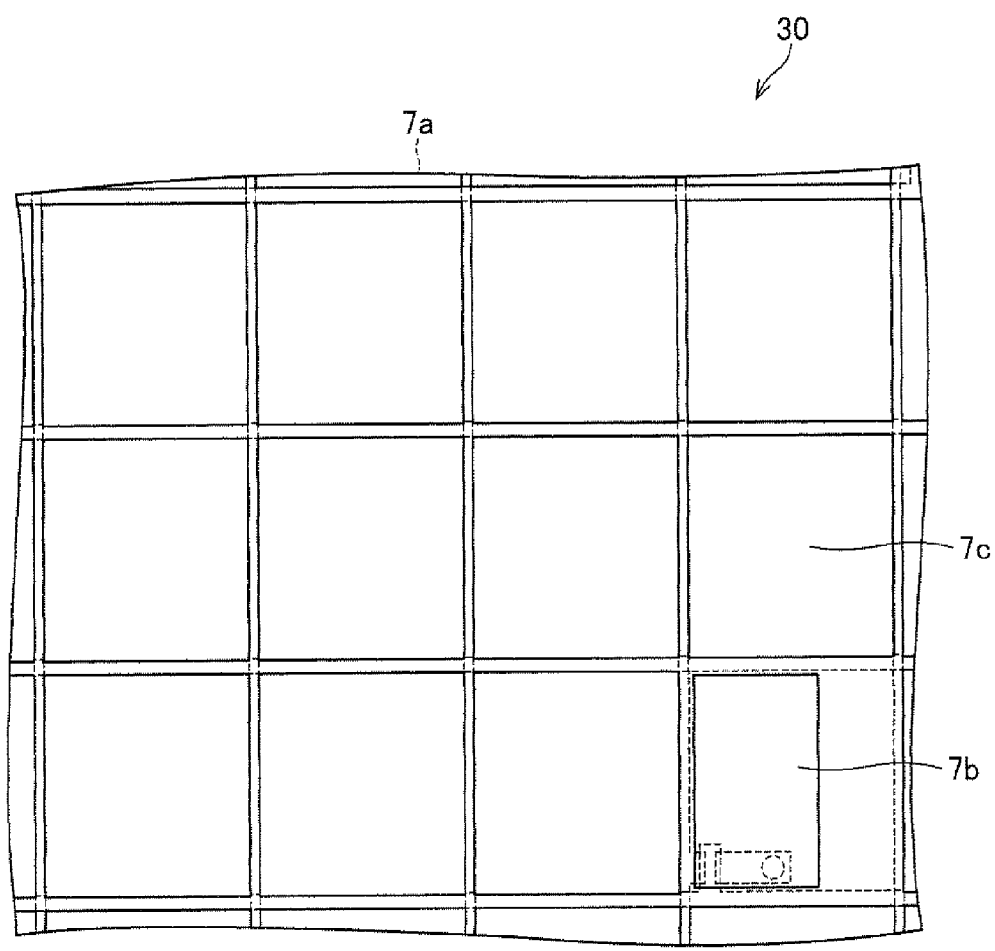
FIG. 8 is a plan view illustrating a state in which a second transparent electrode layer is formed on the first transparent electrode layer and the reflective electrode layer of the active matrix substrate in the state illustrated in FIG. 7.

The following description explains the step (2), that is, the step of forming the pixel electrodes 7, with reference to FIGS. 6 to 8.

FIG. 6 is a plan view illustrating a step of forming a first transparent electrode layer 7a provided as a bottom layer. FIG. 7 is a plan view illustrating a step of forming a pattern of which is to be the reflective electrode layer 7b in the end. FIG. 8 is a plan view illustrating a step of forming a second transparent electrode layer 7c that is provided as a top layer.

First, on the entire substrate of the active matrix substrate 30 in a state illustrated in FIGS. 4 and 5 on which an interlayer insulating film 5 is formed, ITO (Indium Tin Oxide) film (having a film thickness around 800 Å) from which the first transparent electrode layer 7a is formed is formed by sputtering, as illustrated in FIG. 6.

Subsequently, a molybdenum film (having a film thickness of around 500 Å) and an aluminum film (having a film thickness of around 1000 Å) are stacked in this order by sputtering, and a pattern is formed thereon by the PEP technique. This forms the reflective electrode layer 7b, as illustrated in FIG. 7. At this time, the reflective electrode layer 7b is formed so as to occupy a smaller area than that of the first transparent electrode layer 7a in a pixel region (display region) of the pixel electrodes 7.

Next, on the entire reflective electrode layer 7b, a transparent conductive film made of the IZO film is applied by sputtering so as to have a thickness of not more than 300 Å (the thinner the film, the better), as a second transparent electrode layer 7c. Here, an AZO (Aluminum Zinc Oxide) film or a GZO (Gallium Zinc Oxide) film may also be used other than the IZO film, as the transparent electrode layer 7c.

Further, after a photosensitive resin is applied to the entire substrate on which the transparent conductive film is formed, pattern formation is carried out thereon by the PEP technique. In this case, as shown by "L" in FIG. 3, a pattern edge of the first transparent electrode layer 7a is in plane with a pattern edge of the second transparent electrode layer 7c. Having the pattern edge of the first transparent electrode layer 7a in plane with the pattern edge of the second transparent electrode layer 7b also indicates that by simultaneously etching the first transparent electrode layer 7a and the second transparent electrode layer 7c, a displacement between the pattern edge of the first transparent electrode layer 7a and the second transparent electrode layer 7c is within ±0.2 μm.

The active matrix substrate 30 is thus obtained as above.

The active matrix substrate 30 thus arranged has an IZO film formed as the second transparent electrode layer 7c on a top surface (position closest to the liquid crystal layer 25) of the pixel electrodes 7. This reduces a flicker voltage difference between a reflective region a and the transmissive region b, which flicker voltage difference is a cause for occurrence of the flicker, to the least possible amount. Hence, it is possible to improve the display quality.

Figure 9:
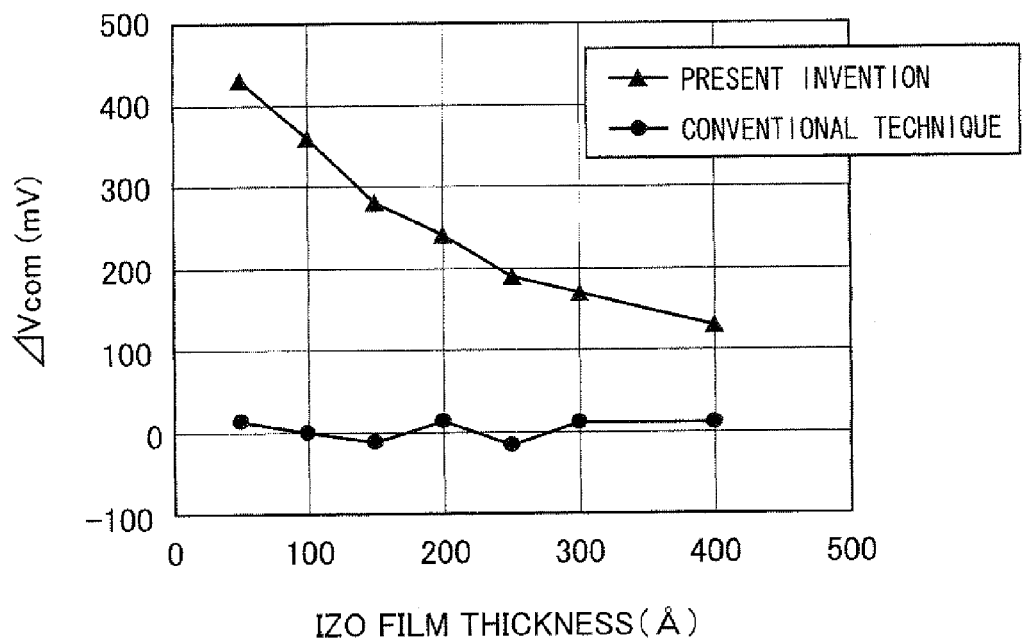
FIG. 9 is a graph showing a relationship between a film thickness of an IZO film and a flicker potential difference.

FIG. 9 is a graph showing a relationship between a film thickness of the IZO film and the flicker voltage difference, ΔVcom. Data shown in FIG. 9 is shown in Table 1 as follows:

TABLE 1

|  | IZO film thickness (Å) | | | | | | |
| --- | --- | --- | --- | --- | --- | --- | --- |
|  | 50 | 100 | 150 | 200 | 250 | 300 | 400 |
| Present Invention | 13 | 0 | −13 | 12 | −17 | 10 | 10 |
| Conventional Technique | 430 | 360 | 280 | 240 | 190 | 170 | 130 |

In the graph shown in FIG. 9, • indicates the present invention, which is a relationship between the flicker voltage difference and a film thickness of the IZO film provided as the transparent electrode layer on a top surface in a case of an arrangement in which a reflective electrode layer is sandwiched between two layers of transparent electrode layers. Further, ▲ indicates the conventional technique, which is a relationship between a flicker voltage difference and a film thickness of an IZO film provided as the transparent electrode layer so as to cover the reflective electrode layer.

The following description explains measurement of the flicker voltage difference.

A method for flicker measurement is described below with reference to FIG. 10.

Figure 10:
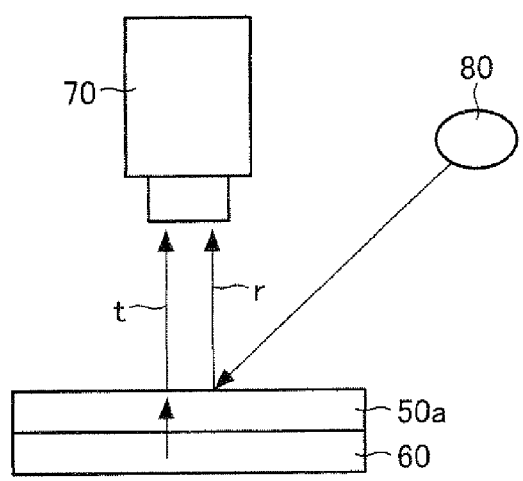
FIG. 10 is a view illustrating a configuration of a system for flicker measurement.

The measurement of the flicker voltage difference is carried out by providing, as illustrated in FIG. 10, (i) a backlight 60 at a position lower to the transflective liquid crystal display device 50a, (ii) a fluorescent lamp 80 at a position diagonally upper of the transflective liquid crystal display device 50a, and (iii) a flicker measuring device 70 (for example, "3298F Multimedia Display Tester", manufactured by Yokogawa Electric Corporation) at a position upper of the transflective liquid crystal display device 50a. Thereafter, light from the backlight 60 (or the fluorescent lamp 80) is caused to be incident on the transflective liquid crystal display device 50a. Meanwhile, an image signal of an intermediate gray scale is inputted to each of the pixel electrodes 8 of the active matrix substrate 20a, and a predetermined counter potential Vcom is inputted to a common electrode 22 of the counter substrate 30a. Subsequently, luminance of a transmitted light r (or a reflected light r) from the transflective liquid crystal display device 50a is measured by the flicker measuring device 70.

Figure 11:
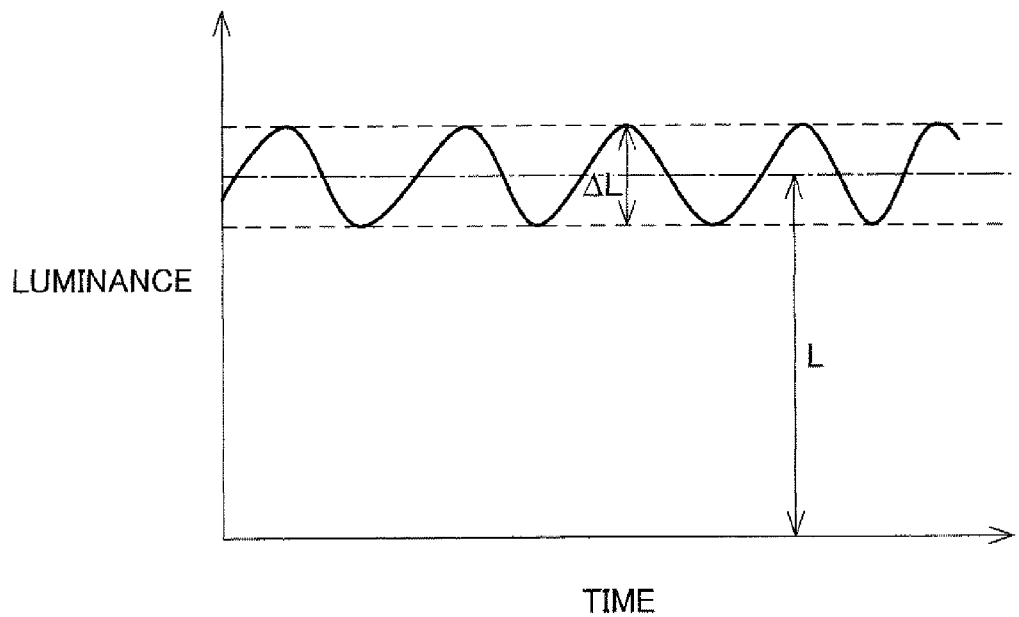
FIG. 11 is a graph showing a relationship between (i) time and (ii) luminance of transmitted light from a transflective liquid crystal display device, measured by the system.

This thus obtains a flicker waveform as shown in FIG. 11. From this flicker waveform, an average luminance L and a flicker amplitude ΔL are calculated; and a flicker rate at a time of a predetermined counter potential Vcom is thus calculated by a relational expression: flicker rate (%)=ΔL/L.

Figure 12:
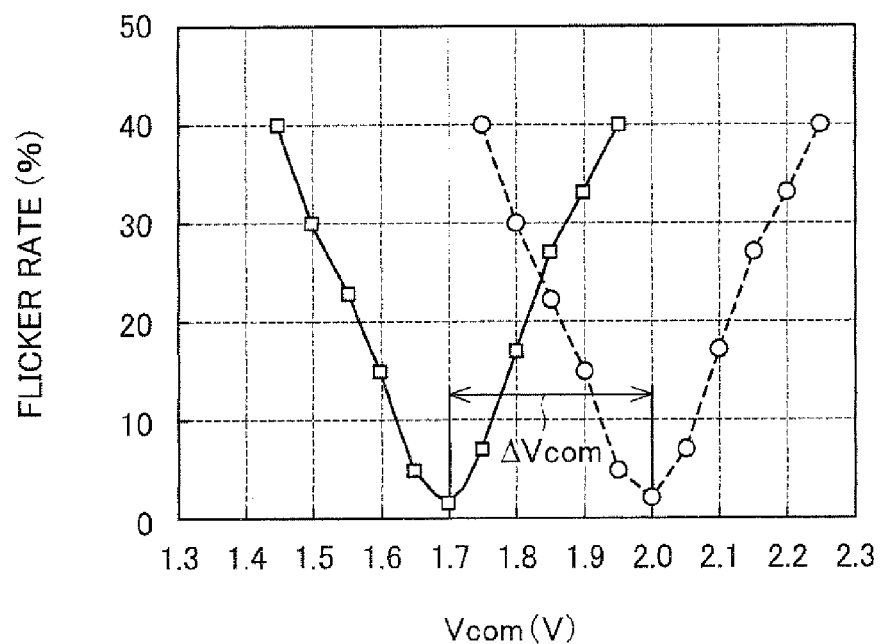
FIG. 12 is a graph showing a relationship between a flicker voltage difference and a flicker rate, in a transmissive mode and a reflective mode of the transflective liquid crystal display device.

As shown in FIG. 12, in the flicker measurement, a counter potential Vcom in a range of 1.75 V to 2.25 V is inputted in display of a transmissive mode in which light from the backlight 60 is incident on the transflective liquid crystal display device 50a, and a counter potential Vcom in a range of 1.45 V to 1.95 V is inputted in display of a reflective mode in which light from the fluorescent lamp 80 is incident on the transflective liquid crystal display device 50a. Note that, a circle marking in FIG. 12 is the flicker rate in the transmissive mode, and a square marking in FIG. 12 is the flicker rate in the reflective mode. The flicker voltage difference is a difference ΔVcom between a Vcom when the flicker rate is the lowest in the transmissive mode and a Vcom when the flicker rate is the lowest in the reflective mode. It is considered that the lower a numerical value of the flicker voltage difference ΔVcom, the more the occurrence of the flicker is suppressed.

With the arrangement of the present invention, as observed from the graph shown in FIG. 9, a flicker potential difference hardly changes regardless of the film thickness of the IZO film, and progresses around 0 mV. As such, the occurrence of the flicker due to an increase in the flicker potential difference is suppressed. As a result, the display quality is improved. That is to say, in the arrangement of the present invention, as long as the IZO film is formed on the top surface as the transparent electrode layer 7c, the thickness is not particularly limited.

In order to suppress a decrease in reflectance of the reflective electrode layer 7b, it is preferable to reduce as much as possible of the thickness of the film of the second transparent electrode layer 7c that is provided so as to cover the reflective electrode layer 7b.

Figure 13:
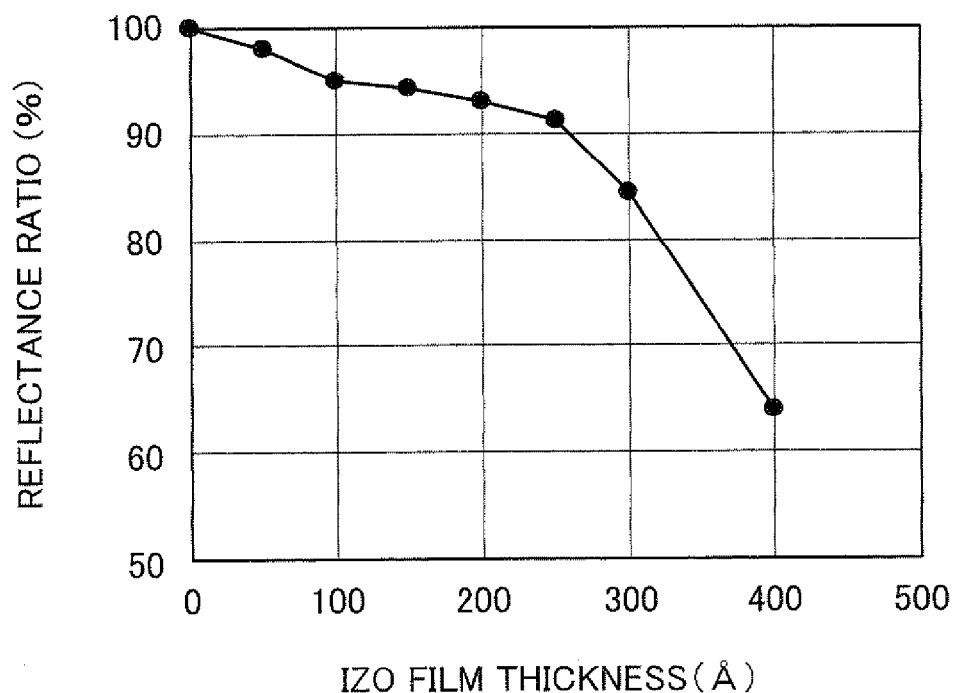
FIG. 13 is a graph showing a relationship between a film thickness of an IZO film and reflectance ratio.

It can be also observed from a graph shown in FIG. 13, that it is preferable to provide the second transparent electrode layer 7c as thin as possible.

FIG. 13 is a graph showing a relationship between the film thickness of the IZO film and a reflectance ratio. Data shown in FIG. 13 is shown in the following Table 2.

TABLE 2

|  | IZO film thickness (Å) | | | | | | | |
| --- | --- | --- | --- | --- | --- | --- | --- | --- |
|  | 0 | 50 | 100 | 150 | 200 | 250 | 300 | 400 |
| Present Invention | 100% | 98% | 95% | 94% | 93% | 91% | 84% | 64% |

As from the above, the thickness of the second transparent electrode layer 7c is not particularly limited as long as the second transparent electrode layer 7c is provided. Hence, it is preferable to provide the second transparent electrode layer 7c as thin as possible, as shown in FIG. 13.

Even if the second transparent electrode layer 7c is provided too thin and is deficient as an electrode layer, the function of the pixel electrodes 7 is not decreased since the first transparent electrode layer 7a is provided in a lower layer of the second transparent electrode layer 7c.

Since the function as the pixel electrodes 7 is not decreased even if the second transparent electrode layer 7c is too thin, it is possible to suppress a decrease in yield caused by the deficiency of the pixel electrodes.

Moreover, the first transparent electrode layer 7a and the second transparent electrode layer 7c are formed together. Thus, hardly any alignment errors generate. Since no parasitic capacitance is generated due to the alignment error, it is possible to eliminate any decrease in display quality caused by the parasitic capacitance.

Second Embodiment

The following description explains another embodiment of the present invention.

Figure 14:
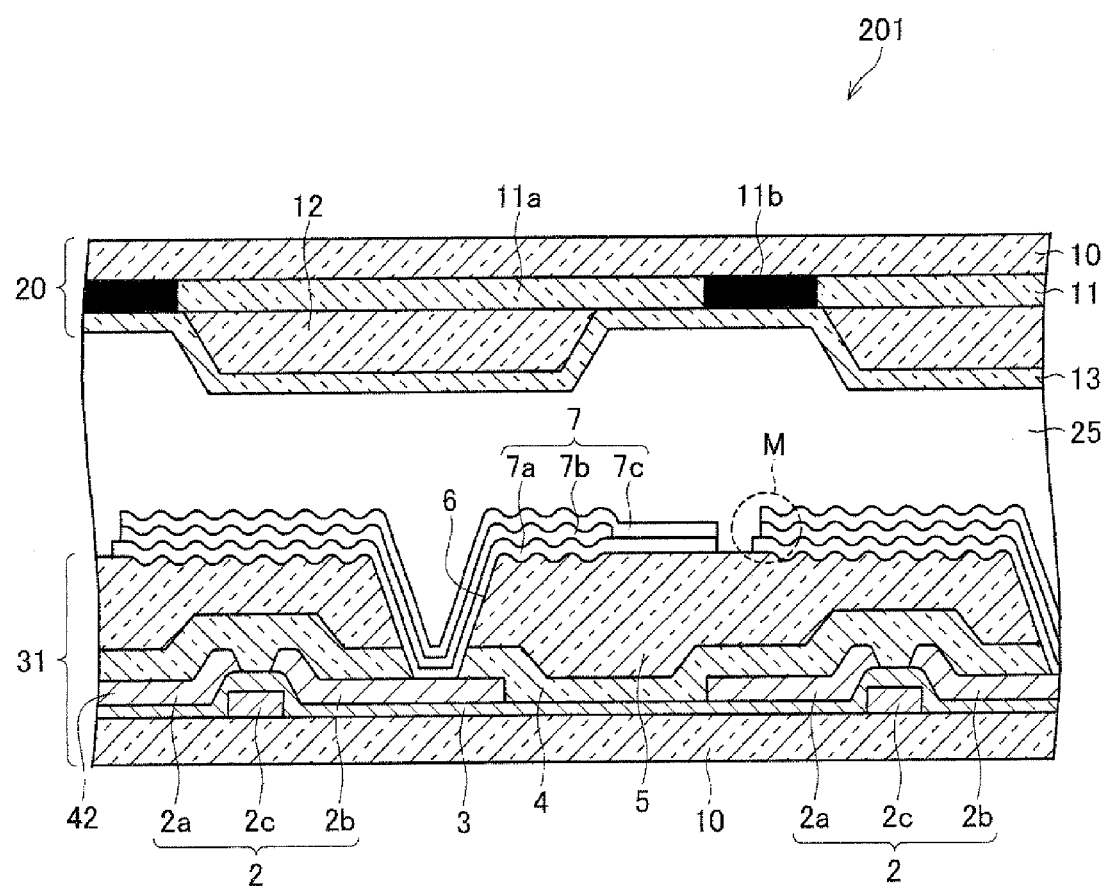
FIG. 14 illustrates another embodiment of the present invention, and is a cross sectional view schematically illustrating an active matrix substrate used in a transflective liquid crystal display device.

FIG. 14 is a view illustrating a schematic cross section of a transflective liquid crystal display device in accordance with the present embodiment.

Note that, as similar to First Embodiment, explanation is made based on a case where a VA (Vertical Alignment) mode is adopted as a display mode of the liquid crystal display device. Moreover, an active matrix drive by use of a TFT (Thin Film Transistor) is adopted as a drive method of the liquid crystal display device. However, the present invention is not limited to this display mode and drive method.

The liquid crystal display device 201, as illustrated in FIG. 14, has a substantially same arrangement as the liquid crystal display device 101 explained in First Embodiment. The difference between the liquid crystal display devices 101 and 201 is that an arrangement of an active matrix substrate 31 in the liquid crystal display device 201 is slightly different from the active matrix substrate 30 in the liquid crystal display device 101 illustrated in FIG. 1.

Namely, the active matrix substrate 30 of First Embodiment is provided such that an alignment error does not generate at the pattern edges (region indicated by "L" in FIG. 3) of the first transparent electrode layer 7a and the second transparent electrode layer 7c, whereas the active matrix substrate 31 of the present embodiment is provided such that an alignment error does not generate at pattern edges (region indicated by "M" in FIG. 14) of the reflective electrode layer 7b and the second transparent electrode layer 7c.

The following description explains a method for manufacturing the active matrix substrate 31.

As described above, First Embodiment and the present embodiment is different in the arrangement of the pixel electrodes 7. Thus, explanation of the step (1) until the pixel electrodes 7 are to be formed is omitted, and just the step (2) in which the pixel electrodes 7 are formed is explained in the present embodiment.

Figure 15:
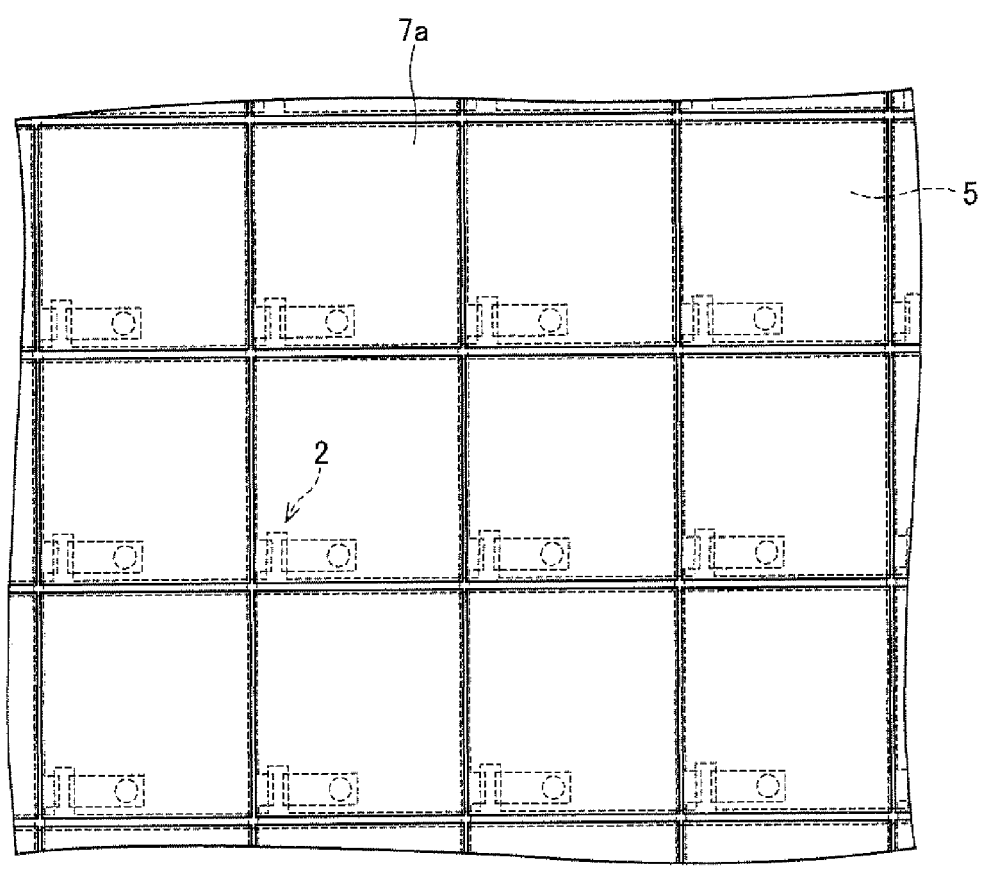
FIG. 15 is a plan view illustrating a state in which a first transparent electrode layer is formed on an interlayer insulating film of the active matrix substrate before the pixel electrode is formed, illustrated in FIG. 4.

Subsequently to the step (1), as illustrated in FIG. 15, ITO (Indium Tin Oxide) film (having a film thickness around 800 Å) from which the first transparent electrode layer 7a is formed is formed by sputtering, on an entire substrate on which an interlayer insulating film 5 is formed. Thereafter, pattern formation is carried out by the PEP technique.

Figure 16:
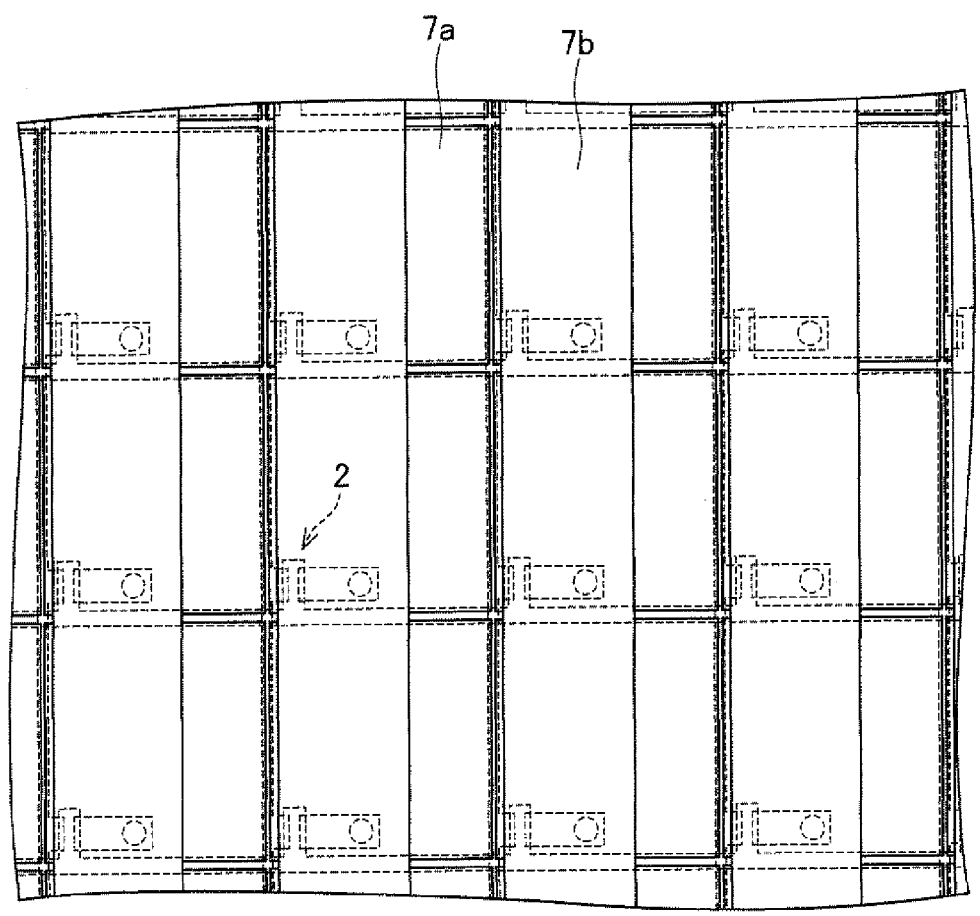
FIG. 16 is a plan view illustrating a state in which a reflective electrode layer is formed on the first transparent electrode layer of the active matrix substrate in the state illustrated in a measurement diagram.

Next, as illustrated in FIG. 16, a molybdenum film (having a film thickness of around 500 Å) and an aluminum film (having a film thickness of around 1000 Å) are stacked in this order by sputtering, and a pattern is formed thereon by the PEP technique. This forms the reflective electrode layer 7b.

Figure 17:
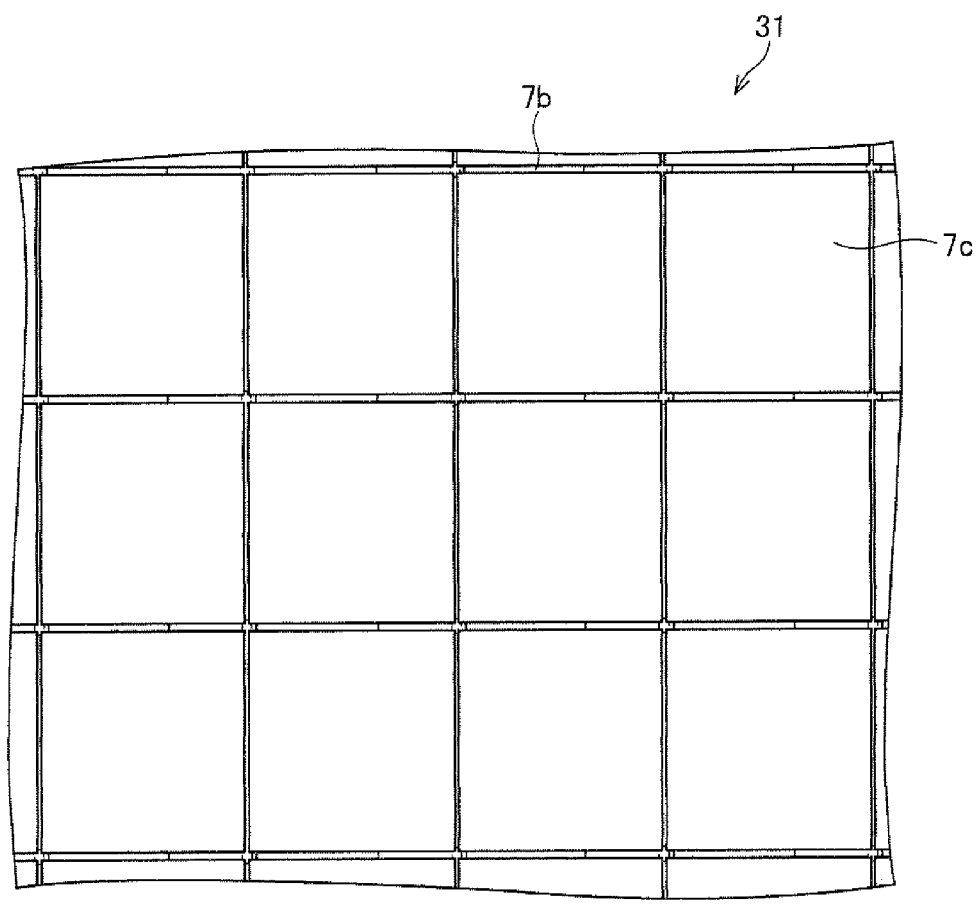
FIG. 17 is a plan view illustrating a state in which a second transparent electrode layer is formed on the first transparent electrode layer and the reflective electrode layer, in the active matrix substrate in the state illustrated in FIG. 16.

Following this, as illustrated in FIG. 17, on the entire substrate on which the reflective electrode layer 7b is formed, a transparent conductive film made of the IZO film from which a second transparent electrode layer 7c is formed is applied by sputtering, so as to have a thickness of not more than 300 Å. Here, an AZO (Aluminum Zinc Oxide) film or a GZO (Gallium Zinc Oxide) film may also be used other than the IZO film, as material of the second transparent electrode layer 7c.

Further, after a photosensitive resin is applied to the entire substrate on which the transparent conductive film is formed, pattern formation is carried out thereon by the PEP technique. This forms the second transparent electrode layer 7c and the reflective electrode layer 7b. In this case, as shown by the "M" in FIG. 14, a pattern edge of the second transparent electrode layer 7c is in plane with a pattern edge of the reflective electrode layer 7b. Having the pattern edge of the second transparent electrode layer 7c in plane with the pattern edge of the reflective electrode layer 7b also indicates that by simultaneously etching the second transparent electrode layer 7c and the reflective electrode layer 7b, a displacement between the pattern edge of the second transparent electrode layer 7c and the reflective electrode layer 7b is within ±0.2 μm.

The active matrix substrate 31 as arranged as above has an IZO film formed as the second transparent electrode layer 7c on a top surface (position closest to the liquid crystal layer 25) of the pixel electrodes 7. This reduces, as similar to the active matrix substrate 30 of First Embodiment, a flicker voltage difference between a reflective region a and the transmissive region b as much as possible, which flicker voltage difference is a cause for occurrence of the flicker. Hence, it is possible to improve the display quality.

Moreover, the reflective electrode layer 7b and the second transparent electrode layer 7c are formed together. Thus, hardly any alignment error generates. Since no parasitic capacitance generates due to the alignment error, it is possible to eliminate any decrease in display quality caused by the parasitic capacitance.

Each of the embodiments described above uses the VA method as the display method of the liquid crystal display device as an example, however the display method is not limited to this. An operational effect as similar to the foregoing operational effect is attainable even by applying the present invention to any other methods.

Moreover, the above embodiments explain examples in which the IZO film is used as the material for the second transparent electrode layer 7c. However, the material is not limited to this, and, for instance, an ITO (Indium Tin Oxide) film may be used as another transparent conductive film. In this case, electrical corrosion occurs when the ITO is in contact with Al. Thus, it is preferable to use Al alloy metal as material for the reflective electrode layer that is to be in contact with the ITO.

Furthermore, the first transparent electrode layer, the reflective electrode layer, and the second transparent electrode layer may be stacked in other various ways such as arrangements described below, other than the arrangements as illustrated in FIGS. 1 and 14.

Figure 18:
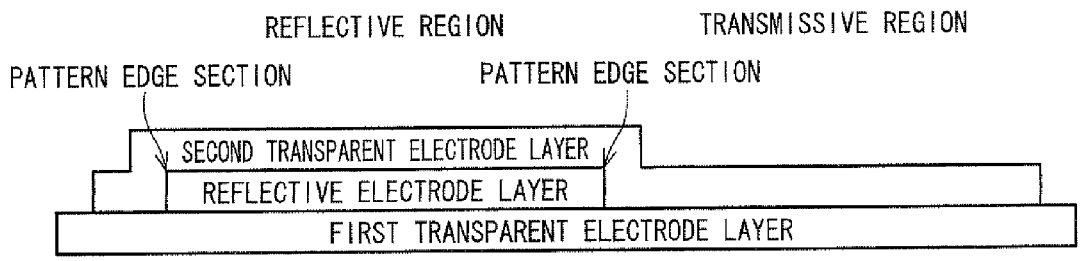
FIG. 18(a) is a view illustrating one example of an arrangement in which a first transparent electrode layer, a reflective electrode layer, and a second transparent electrode layer are stacked in an active matrix substrate of the present invention.
FIG. 18(b) is a view illustrating one example of an arrangement in which a first transparent electrode layer, a reflective electrode layer, and a second transparent electrode layer are stacked in an active matrix substrate of the present invention.
FIG. 18(c) is a view illustrating one example of an arrangement in which a first transparent electrode layer, a reflective electrode layer, and a second transparent electrode layer are stacked in an active matrix substrate of the present invention.
Figure 18:
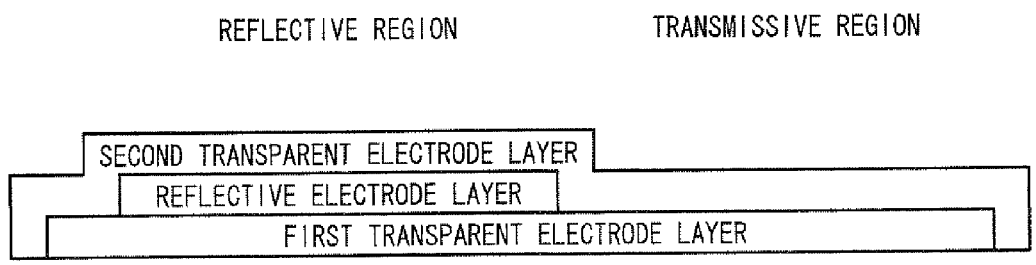
Figure 18:
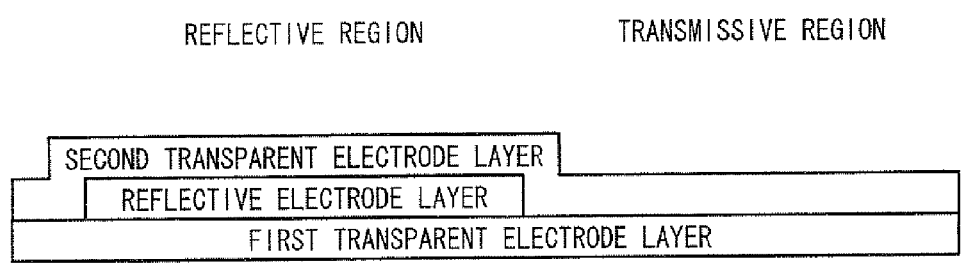

For example, as illustrated in FIG. 18(*a*), the arrangement may be one in which the reflective electrode layer is entirely stacked on the first transparent electrode layer, and the second transparent electrode layer is provided so as to entirely cover pattern edge sections of the reflective electrode layer.

In this case, pattern edges of the pixel electrodes are determined by pattern edges of the first transparent electrode layer.

Moreover, as illustrated in FIG. 18(*b*), the second transparent electrode layer may be provided so as to entirely cover pattern edge sections of the first transparent electrode layer.

In this case, the pattern edges of the pixel electrode are determined by pattern edges of the second transparent electrode layer.

Furthermore, as illustrated in FIG. 18(*c*), the second transparent electrode layer may be provided so as to have end surfaces which are in plane with end surfaces of the first transparent electrode layer, respectively.

In this case, the pattern edges of the pixel electrode are determined by the pattern edges of the first and second transparent electrode layers.

Figure 19:
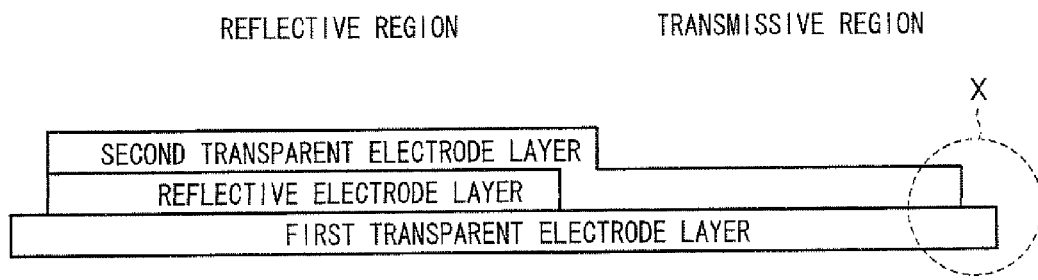
FIG. 19(a) is a view illustrating another example of an arrangement in which a first transparent electrode layer, a reflective electrode layer, and a second transparent electrode layer are stacked in an active matrix substrate of the present invention.
FIG. 19(b) is a view illustrating another example of an arrangement in which a first transparent electrode layer, a reflective electrode layer, and a second transparent electrode layer are stacked in an active matrix substrate of the present invention.
Figure 19:
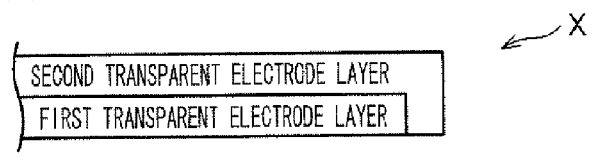

Moreover, as illustrated in FIG. 19(*a*), the second transparent electrode layer may be provided so as to have a first end surface opposite to a second end surface on which side the second transparent electrode layer is directly stacked on the first transparent electrode layer, the first end surface being in plane with a corresponding end surface of the reflective electrode layer.

In this case, the pattern edges of the pixel electrodes are determined by the pattern edges of the first transparent electrode layer.

Furthermore, as illustrated in FIG. 19(*b*), the second transparent electrode layer may be provided so as to cover a pattern edge section of the first transparent electrode layer on the side where the second transparent electrode layer is directly stacked on the first transparent electrode layer.

In this case, the pattern edges of the pixel electrodes are determined by the pattern edges of the second transparent electrode layer.

Figure 20:
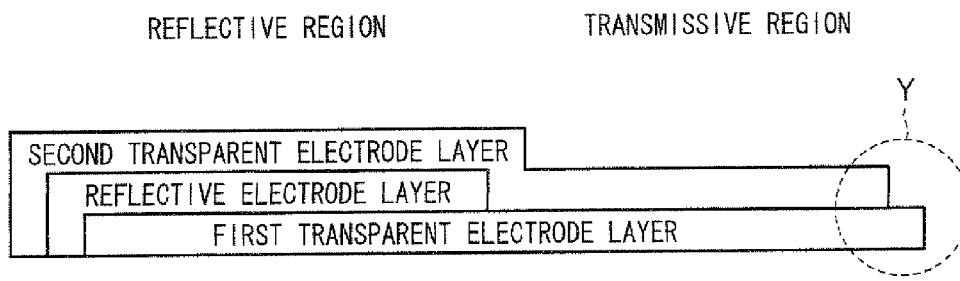
FIG. 20(a) is a view illustrating still another example of an arrangement in which a first transparent electrode layer, a reflective electrode layer, and a second transparent electrode layer are stacked in an active matrix substrate of the present invention.
FIG. 20(b) is a view illustrating still another example of an arrangement in which a first transparent electrode layer, a reflective electrode layer, and a second transparent electrode layer are stacked in an active matrix substrate of the present invention.
FIG. 20(c) is a view illustrating still another example of an arrangement in which a first transparent electrode layer, a reflective electrode layer, and a second transparent electrode layer are stacked in an active matrix substrate of the present invention.
Figure 20:
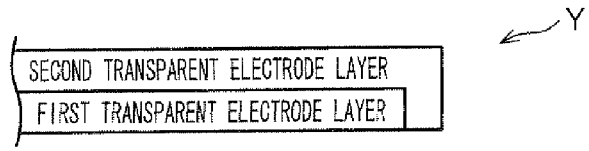
Figure 20:
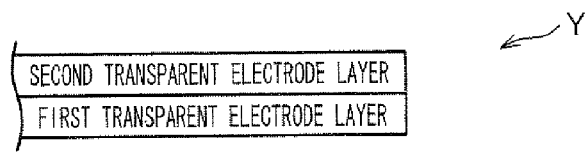

Moreover, as illustrated in FIG. 20(a), the reflective electrode layer is provided so as to cover a pattern edge section of the first transparent electrode layer on a side opposite to a side where the second transparent electrode layer is directly stacked on the first transparent electrode layer, and the second transparent electrode layer is provided so as to entirely cover pattern edge sections of the reflective electrode layer.

In this case, a reflective region of the pattern edges in each of the pixel electrodes is determined by the pattern edges of the second transparent electrode layer, and the transmissive region of the pattern edges is determined by the pattern edges of the first transparent electrode layer.

Moreover, as illustrated in FIG. 20(b), the second transparent electrode layer may be provided so as to cover a pattern edge section of the first transparent electrode layer on the side where the second transparent electrode layer is directly stacked on the first transparent electrode layer.

In this case, the pattern edges of the reflective region and the transmissive region are both determined by the pattern edges of the second transparent electrode layer.

Furthermore, as illustrated in FIG. 20(c), the second transparent electrode layer may be provided so as to have end surfaces which are in plane with end surfaces of the first transparent electrode layer, respectively.

In this case, the pattern edges of the transmissive region are determined by the pattern edges of the first and second transparent electrode layers.

Figure 21:
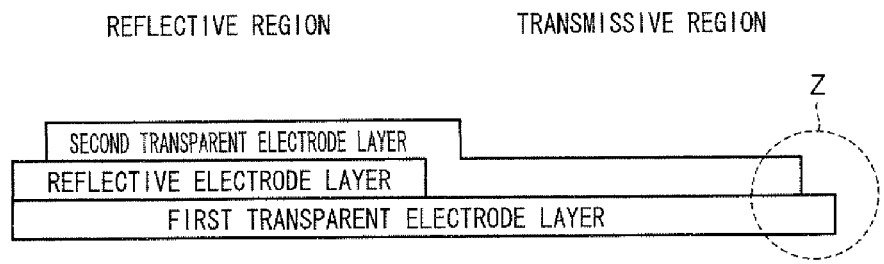
FIG. 21(a) is a view illustrating still another example of an arrangement in which a first transparent electrode layer, a reflective electrode layer, and a second transparent electrode layer are stacked in an active matrix substrate of the present invention.
FIG. 21(b) is a view illustrating still another example of an arrangement in which a first transparent electrode layer, a reflective electrode layer, and a second transparent electrode layer are stacked in an active matrix substrate of the present invention.
Figure 21:
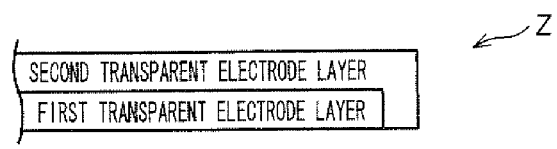
Figure 22:
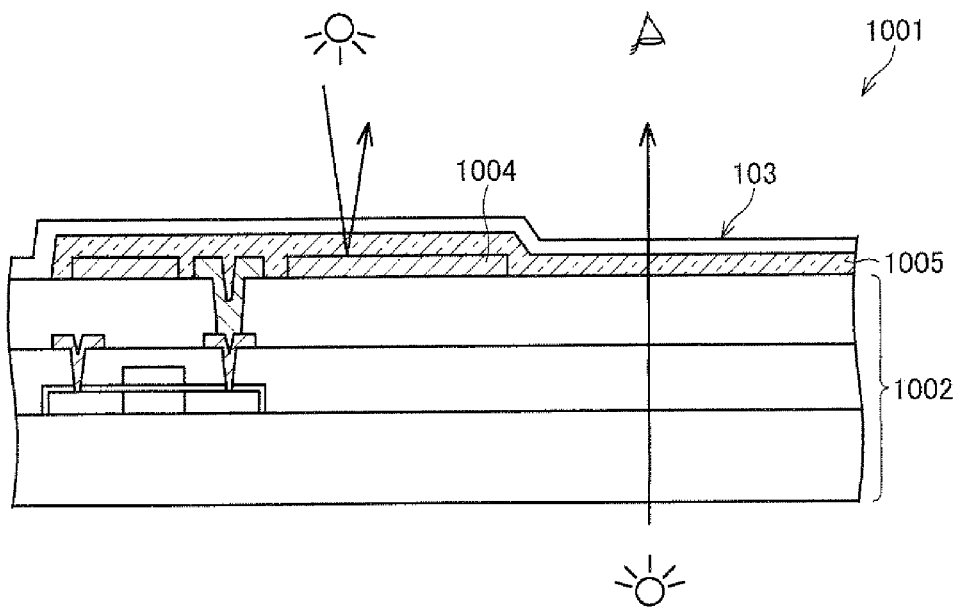
FIG. 22 is a cross sectional view schematically illustrating an active matrix substrate that is used in a conventional transflective liquid crystal display device.
Figure 23:
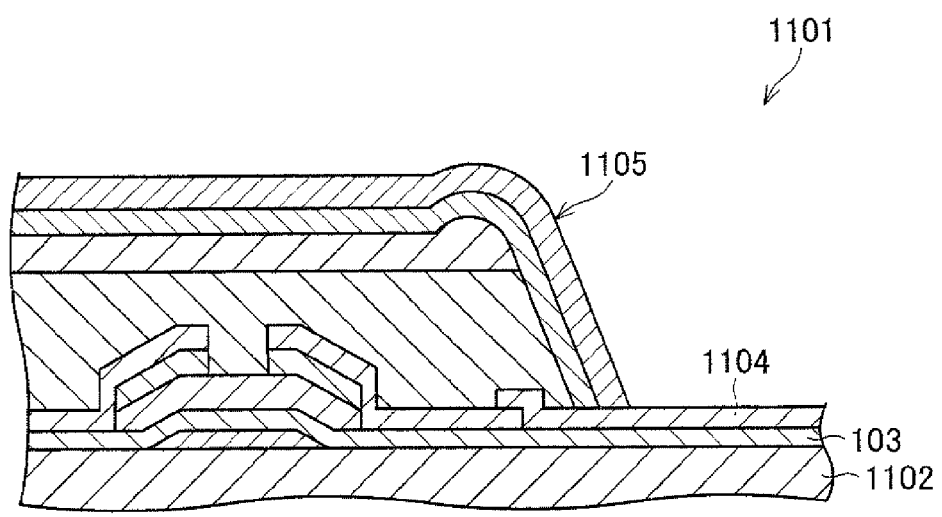
FIG. 23 is a cross sectional view schematically illustrating another active matrix substrate that is used in a conventional transflective liquid crystal display device.

Moreover, as illustrated in FIG. 21(a), the reflective electrode layer and the second transparent electrode layer may be arranged such that the reflective electrode layer is provided so as to cover a pattern edge section of the first transparent electrode layer on a side opposite to a side where the second transparent electrode layer is directly stacked on the first transparent electrode layer, and the second transparent electrode is provided so as to cover just a pattern edge section of the reflective electrode layer on a side where the second transparent electrode layer is directly stacked on the first transparent electrode layer.

In this case, the reflective region of the pattern edges in each of the pixel electrodes is determined by the pattern edges of the second transparent electrode layer, and the transmissive region of the pattern edges is determined by the pattern edges of the first transparent electrode layer.

Further, as illustrated in FIG. 21(b), the second transparent electrode layer may be provided so as to cover a pattern edge section of the first transparent electrode layer on a side where the second transparent electrode layer is directly stacked on the first transparent electrode layer.

In this case, the pattern edges of the reflective region and the transmissive region are both determined by the pattern edges of the second transparent electrode layer.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The invention is suitable for a transflective liquid crystal display device, and a display apparatus which includes the transflective liquid crystal display device such as a mobile phone, a television receiver and the like.

The invention claimed is:

1. An active matrix substrate comprising:
   a plurality of switching elements provided on a transmissive insulating substrate; and
   pixel electrodes electrically connected to the plurality of switching elements, respectively,
   each of said pixel electrodes including:
   a first transparent electrode layer formed substantially across a reflective region and a transmissive region;
   a reflective electrode layer formed in the reflective region, the reflective electrode layer having a smaller area than that of the first transparent electrode layer and at least one part of the reflective electrode layer being stacked on the first transparent electrode layer; and
   a second transparent electrode layer stacked on the first transparent electrode layer in the transmissive region, so as to cover at least the reflective electrode layer in the reflective region.

2. The active matrix substrate as set forth in claim 1, wherein the reflective electrode layer is entirely stacked on the first transparent electrode layer, and
   the second transparent electrode layer is provided so as to entirely cover pattern edge sections of the reflective electrode layer.

3. The active matrix substrate as set forth in claim 2, wherein the second transparent electrode layer is provided so as to entirely cover pattern edge sections of the first transparent electrode layer.

4. The active matrix substrate as set forth in claim 2, wherein the second transparent electrode layer is provided so as to have end surfaces which are in plane with end surfaces of the first transparent electrode layer, respectively.

5. The active matrix substrate as set forth in claim 1, wherein the second transparent electrode layer is provided so as to have a first end surface opposite to a second end surface on which side the second transparent electrode layer is directly stacked on the first transparent electrode layer, the first end surface being in plane with a corresponding end surface of the reflective electrode layer.

6. The active matrix substrate as set forth in claim 5, wherein the second transparent electrode layer is provided so as to cover a pattern edge section of the first transparent electrode layer on a side where the second transparent electrode layer is directly stacked on the first transparent electrode layer.

7. The active matrix substrate as set forth in claim 1, wherein the reflective electrode layer is provided so as to cover a pattern edge section of the first transparent electrode layer on a side opposite to a side where the second transparent electrode layer is directly stacked on the first transparent electrode layer, and
   the second transparent electrode layer is provided so as to entirely cover pattern edge sections of the reflective electrode layer.

8. The active matrix substrate as set forth in claim 7, wherein the second transparent electrode layer is provided so as to cover a pattern edge section of the first transparent electrode layer on the side where the second transparent electrode layer is directly stacked on the first transparent electrode layer.

9. The active matrix substrate as set forth in claim 2, wherein the second transparent electrode layer is provided so as to have end surfaces which are in plane with end surfaces of the first transparent electrode layer, respectively.

10. The active matrix substrate as set forth in claim 1, wherein the reflective electrode layer is provided so as to cover a pattern edge section of the first transparent electrode layer on a side opposite to a side where the second transparent electrode layer is directly stacked on the first transparent electrode layer, and the second transparent electrode layer is provided so as to cover just a pattern edge section of the reflective electrode layer on a side where the second transparent electrode layer is directly stacked on the first transparent electrode layer.

11. The active matrix substrate as set forth in claim 10, wherein the second transparent electrode layer is provided so as to cover a pattern edge section of the first transparent electrode layer on a side where the second transparent electrode layer is directly stacked on the first transparent electrode layer.

12. The active matrix substrate as set forth in claim 1, wherein the second transparent electrode layer is an IZO (Indium Zinc Oxide) layer.

13. The active matrix substrate as set forth in claim 12, wherein the IZO layer has a thickness set in a range of 50 Å to 300 Å.

14. The active matrix substrate as set forth in claim 1, wherein the second transparent electrode layer is an ITO (Indium Tin Oxide) layer.

15. The active matrix substrate is set forth in claim 14, wherein the reflective electrode layer is made of Al alloy metal.

16. A liquid crystal display device comprising:
an active matrix substrate including (i) a plurality of switching elements provided on a transmissive insulating substrate and (ii) pixel electrodes electrically connected to the plurality of switching elements, respectively; and
a counter substrate on which counter electrodes are provided so as to face the active matrix substrate,
the active matrix substrate being an active matrix substrate recited in claim 1.

17. An electronic apparatus comprising a liquid crystal display device recited in claim 16.

18. A method for manufacturing an active matrix substrate comprising (i) a plurality of switching elements provided on a transmissive insulating substrate and (ii) pixel electrodes electrically connected to the plurality of switching elements, respectively,
said method comprising the steps of:
(a) forming the plurality of switching elements on the transmissive insulating substrate; and
(b) forming each of the pixel electrodes that are electrically connected to the plurality of switching elements, respectively, formed on the insulating substrate,
the step (b) including the steps of:
forming a first transparent electrode layer which is located substantially across a reflective region and a transmissive region;
forming a reflective electrode layer in the reflective region on the first transparent electrode layer, the reflective electrode layer having a smaller area than that of the first transparent electrode layer; and
forming a second transparent electrode layer over the first transparent electrode layer in at least the transmission region and so as to cover at least part of the reflective electrode layer in the reflective region.

19. A method for manufacturing an active matrix substrate comprising (i) a plurality of switching elements provided on a transmissive insulating substrate and (ii) pixel electrodes electrically connected to the plurality of switching elements, respectively,
said method comprising the steps of:
(a) forming the plurality of switching elements on the transmissive insulating substrate; and
(b) stacking (i) a first transparent electrode layer electrically connected to the plurality of switching elements formed on the insulating substrate, the first transparent electrode formed substantially across a reflective region and a transmissive region, (ii) a reflective electrode layer in the reflective region stacked on the first transparent electrode layer, the reflective electrode layer having a smaller area than that of the first transparent electrode layer, and (iii) a second transparent electrode layer stacked over at least part of the first transparent electrode layer in the transmissive region and so as to cover at least the reflective electrode layer in the reflective region, so as to form each of the pixel electrodes,
the step (b) including the steps of:
forming and patterning a first transparent conductive film on the insulating substrate so as to form the first transparent electrode layer;
forming and patterning a reflective electrode film on the first transparent electrode layer so as to form the reflective electrode layer; and
forming a second transparent electrode layer by forming and patterning a second transparent conductive film from which the second transparent electrode layer is formed so as to cover the reflective electrode layer formed on the first transparent electrode layer.

20. A method for manufacturing an active matrix substrate comprising (i) a plurality of switching elements provided on a transmissive insulating substrate and (ii) pixel electrodes electrically connected to the plurality of switching elements, respectively,
said method comprising the steps of:
(a) forming the plurality of switching elements on the transmissive insulating substrate; and
(b) stacking (i) a first transparent electrode layer electrically connected to the plurality of switching elements formed on the insulating substrate, (ii) a reflective electrode layer stacked on the first transparent electrode layer, the reflective electrode layer having a smaller area than that of the first transparent electrode layer, and (iii) a second transparent electrode layer stacked so as to cover at least the reflective electrode layer, so as to form each of the pixel electrodes,
the step (b) including the steps of:
forming a first transparent conductive film on the insulating substrate formed substantially across a reflective region and a transmissive region;
forming and patterning a reflective electrode film in the reflective region on the first transparent conductive film so as to fowl the reflective electrode layer;
forming a second transparent conductive film in at least the transmissive region from which the second transparent electrode layer is formed so as to cover the reflective electrode layer formed on the first transparent conductive film; and
patterning the first and second transparent conductive films together so as to form the first and second transparent electrode layers.

* * * * *